June 1, 1954  C. H. INGWER ET AL  2,679,686
PIPE CUTTER

Filed Feb. 24, 1949  4 Sheets-Sheet 1

INVENTORS
CARL H. INGWER
CLYDE E. WRIGHT
BY
*J. D. Dereglaw*

June 1, 1954 C. H. INGWER ET AL 2,679,686
PIPE CUTTER
Filed Feb. 24, 1949 4 Sheets-Sheet 2
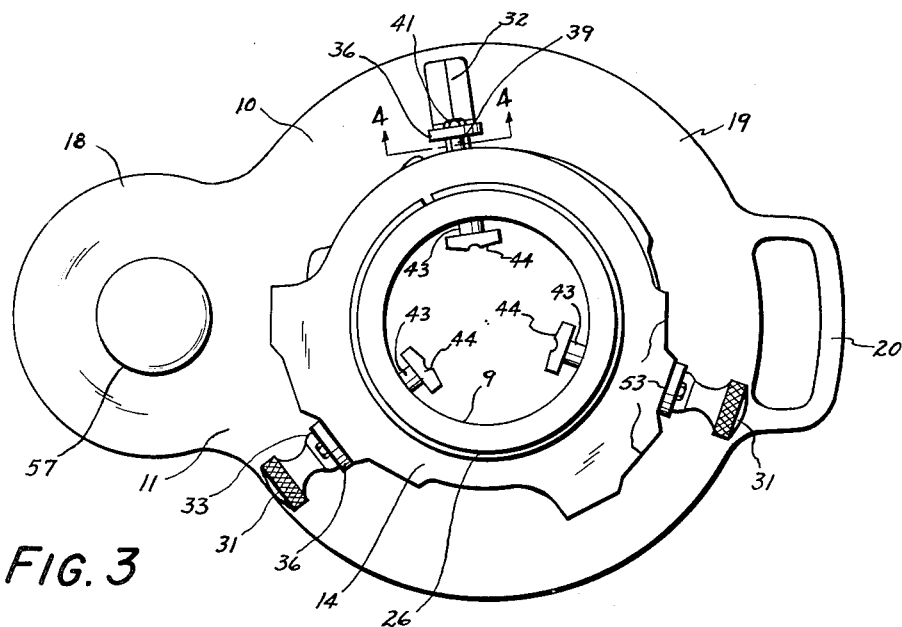
FIG. 3
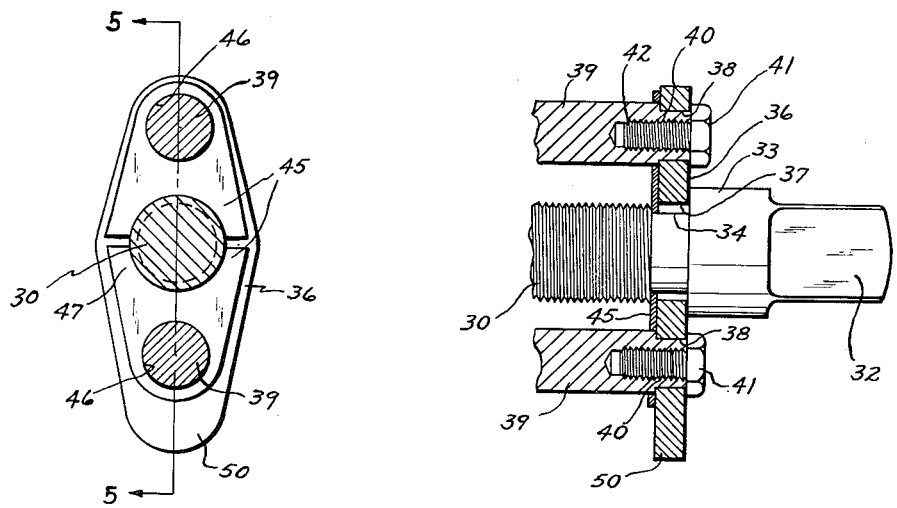
FIG. 4
FIG. 5
INVENTORS
CARL H. INGWER
CLYDE E. WRIGHT
BY J. D. Douglass INVENTORS
CARL H. INGWER
CLYDE E. WRIGHT
BY
*J. D. Douglas*

June 1, 1954  C. H. INGWER ET AL  2,679,686
PIPE CUTTER

Filed Feb. 24, 1949  4 Sheets-Sheet 4

INVENTORS
CARL H. INGWER
CLYDE E. WRIGHT
BY
J. D. Douglass

Patented June 1, 1954

2,679,686

UNITED STATES PATENT OFFICE 2,679,686

PIPE CUTTER

Carl H. Ingwer and Clyde E. Wright, Elyria, Ohio, assignors to The Ridge Tool Company, Elyria, Ohio Application February 24, 1949, Serial No. 78,033

2 Claims. (Cl. 30—97)

This invention relates to pipe cutting tools and more particularly to a tool adapted to be power driven.

Many devices have been proposed for the cutting of pipe. For smaller pipes hand operated roller type cutters or a hack saw are the most commonly used and indeed are adequate. However, for pipe sizes upwards of 1½ inches or thereabouts, hand operated tools are both tedious, wearisome and unnecessarily time consuming.

For these larger sizes, therefore, power driven tools, or at least a gear driven hand operated tool, is extremely desirable. Such tools have been marketed for use but most of them require adjustment of the cutters by hand on each turn of the pipe. This may be wasteful of time since hand adjustment is seldom very accurate. For instance, if the pipe is rotated more than one turn or one cycle during this turn before the cutters are adjusted any time beyond that one cycle is wasted. Moreover, if the adjustment is made by hand and is too small, the tool may require an unnecessary number of turns. If the adjustment is too large it may result in unduly dulling the cutters.

Since a great deal of such piping work is done in the field, it is highly desirable that such a tool be portable. To that end a group of pipe working tools has grown up which are capable of being driven by a portable power unit.

By our invention we have provided a tool with which to cut the large sizes of pipe, which can be driven by a portable power unit or by hand by a handle, and in which the adjustment of the cutting bits is completely automatic requiring no hand adjustments whatsoever after the initial placing of the bits.

In addition, the form of the cutting bits makes possible quicker and cleaner cutting of the pipe and leaves an edge free from burrs on which it is very easy to start a threading tool if so desired.

The details of our device will become more apparent upon reference to the following description and figures throughout which like parts are designated by like reference characters.

In the drawings:

Fig. 3 is a bottom view;

Fig. 4 is a detailed sectional view taken along line 4—4 of Fig. 3;

Fig. 5 is a sectional view along lines 5—5 of Fig. 4;

Figure 1:
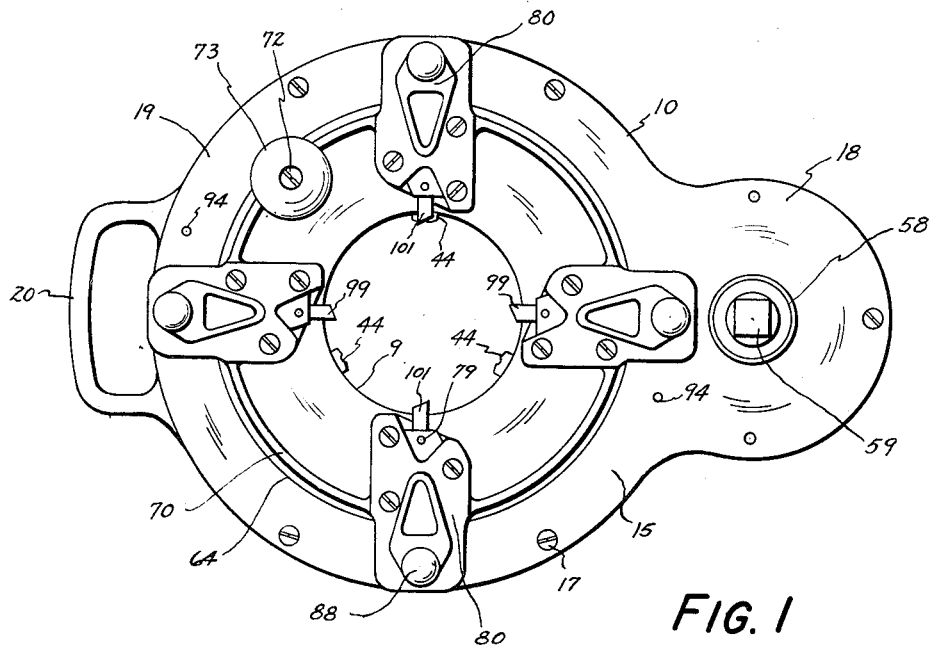
Fig. 1 is a top view of our device fully assembled.
Figure 2:
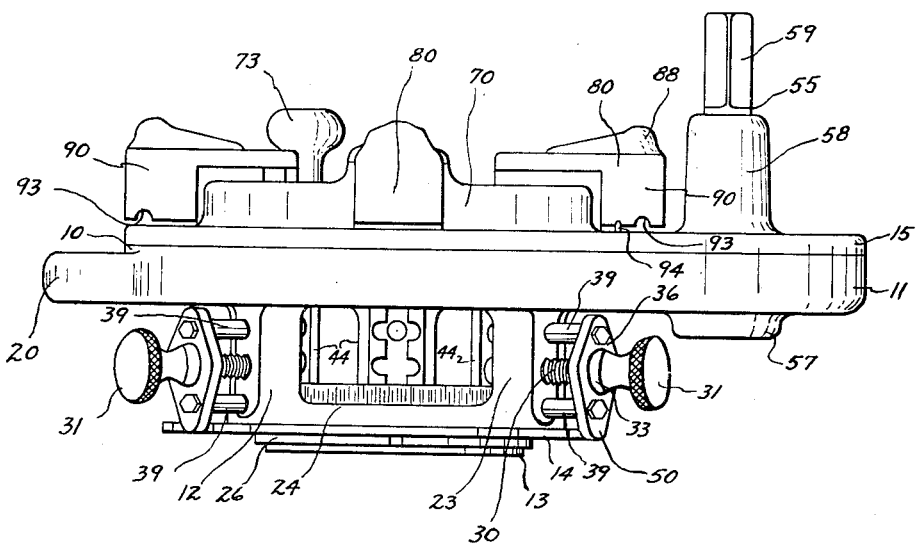
Fig. 2 is a side view of our device.
Figure 6:
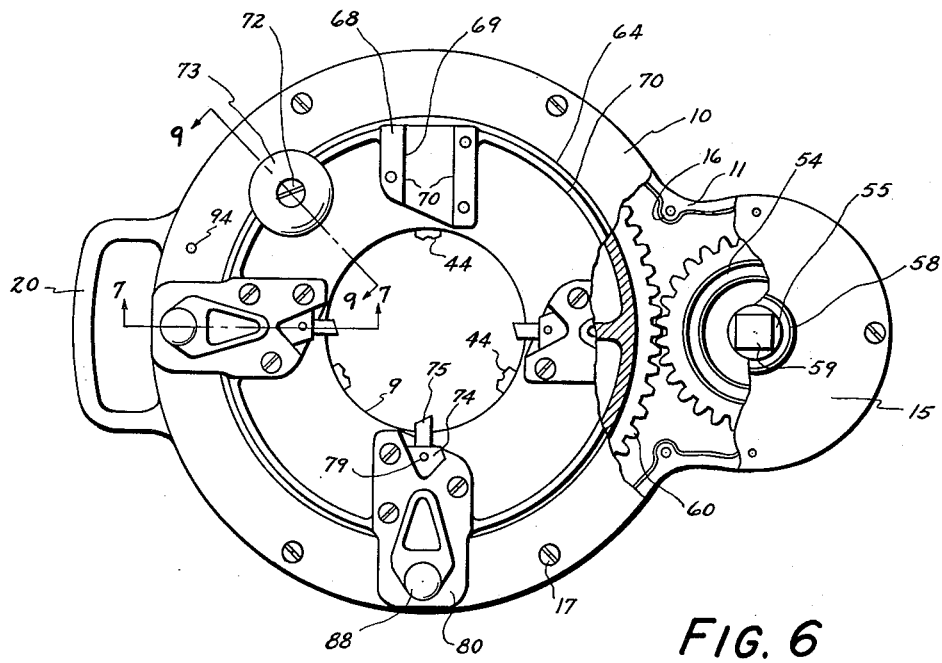
Fig. 6 is a top view of our device with a portion of the cover broken away to show the gears and with one cutter and its operating mechanism removed from the carrier.

Briefly, our device includes a housing in which is journalled a pinion adapted to be driven from an external power source. A gear means in mesh with the pinion and having an opening in the center through which a pipe can protrude is also journalled in the housing. This gear means carries a group of cutter carriers which in turn provide guides and support for the cutters. The automatic adjustment mechanism is also enclosed primarily in these carriers. Clamping means to hold the device on the pipe and a handle to provide a means of turning the device more quickly on the pipe to bring the cutters into engagement therewith or to back them off are also provided.

More specifically and referring to the drawings, our device is primarily enclosed in a housing 10 which comprises two separate pieces, a gear case 11 which also includes the mounting 12 for the clamping device and a supporting boss 13 for the gage ring 14 of the clamping device hereinafter described and a gear case cover 15. The shape of the gear case is generally that of two intersecting circles of unequal diameter with a large central opening 9 in the larger circle through which the pipe may protrude.

On the interior of the gear case along the periphery a series of bosses 16 are provided, each of which is drilled and tapped to receive screws 17 which hold the cover 15 in place on the gear case 11. Opposite the smaller circular portion 18 and attached to the larger circular portion 19, we have provided a handle 20 to facilitate the handling and placing of our device.

On the underside of the gear case, we have provided a clamping device similar to that described in Patent No. 1,973,231 issued to W. O. Thewes on September 11, 1934, except that the clamping jaws are much longer as described hereafter. This device, as adapted to our tool, comprises three legs 23 supported at their lower extremity by an annular web 24 which also provides the boss 13 on which can be journalled the gage ring 14.

A split ring 26 disposed in a groove 27 in the boss 13 holds the gage ring in its proper position on the boss.

Three holes are provided in each of the legs. The central hole 28 is threaded with a coarse thread to receive the adjusting screws of the clamp. The other two holes 29, one above and one below the central hole 28 are accurately spaced and reamed to close tolerance to provide guide means for the clamping device as hereafter described.

The clamping screws 30 are threadably engaged in the central holes 28 in each leg and extend outwardly therefrom. Two of these screws may have knurled knobs 31 at their outward ends for quick hand adjustment. The third screw has a square shank 32 so that it may be turned with a wrench and thereby tightened upon the pipe. At the base of the knob 31 and shank 32 an enlarged flange 33 is provided. A neck 34 of slightly smaller diameter than the minor diameter of the threads is provided just below this flange. A plate 36 surrounds this neck and abuts the flange. This plate also has three holes corresponding to the three in the leg 23. The holes are spaced the same distance apart so that the parts inserted into the holes will be in alignment with the holes in the legs. The central hole 37 which surrounds the neck 34 of the screw is of such diameter that the threaded portion of the screw 30 can be inserted. The two flanking holes 38 are of somewhat smaller diameter than those in the legs 23.

Guide pins 39 are slidably journalled in the holes 29 in the legs 28. At one end 40 of the pin a reduced diameter is turned, which is a close fit with the holes 38. This end is inserted through the holes 38 and the pin is held in place by a cap screw 41 which is screwed into a tapped hole 42 in the pin.

The other end 43 of each pin 39 is also of reduced diameter and is threaded into the clamping jaw 44. The clamping jaw which extends axially of the central opening for some distance along the pipe is engaged by the pair of guide pins and is held in place and guided thereby. The clamping screw 30 and the guide pins 39 are proportioned such that the end of the screw abuts the jaw and serves to press it against the pipe to clamp our device securely thereon. The guide pins serve to auxiliary press the clamping jaw against the pipe although their primary purpose is to guide the jaw. It will be apparent that the long jaws extending along the pipe will serve to keep our tool accurately aligned and centered on the pipe so that the cut will be in a plane perpendicular to the axis.

Just beneath the plate 36 are a pair of keepers 45 formed of heat treated steel. Each keeper has a hole 46 which surrounds the end 40 of the guide pin and opposite the hole, the end 47 of the keeper is formed in the shape of a semicircle of a diameter to provide a slightly loose fit with the neck 34 of the clamping screw. Thus the two keepers surrounding the neck of the screw prevent the plate 36 from sliding over the screw and thus when the screw is retracted from the hole, the keepers hold the plate against the flange 33 and the whole assembly is withdrawn.

The gage plate 14, similar to that described in the aforesaid Patent No. 1,973,231, is rotatably journalled on its support boss 13 and is held in place by a split ring 26 seated in a groove 27 in the boss. Extended ears 50, on the plates 36 on the two assemblies with knurled screws, engage the steps 53 in the manner described in the aforesaid patent to locate the device on the pipe and the third screw is then driven down tight to clamp the device in place, properly centered.

The driving pinion 54 is enclosed in the small portion 18 of the housing and is keyed to its shaft 55. One end of the shaft 55 is journalled in a boss 57 on the under side of the small portion of the housing. The shaft is also journalled over a greater part of its length in a large boss 58 in a similar position on the cover 15. The other end 59 of the shaft which extends beyond the cover is formed in the shape of a square to receive the joint from a portable power unit or handle not shown.

The driven gear 60 is enclosed in the larger portion 19 of the housing and is in mesh with the pinion 54. An opening 61 through this gear similar to that in the housing is provided so that the gear surrounds the pipe. A raised web 62 is provided in the interior of the gear case 11 on which the gear is rotatably journalled. The flat top surface 63 of this web is also finished smooth to provide a thrust bearing surface for the underside 66 of an inner flange 66a of the gear. The outer surface is also finished to provide a sliding fit for an inner web 66b on the gear. The gear is also rotatably journalled in the central opening 64 of the gear case cover 15. The inner surface of the cover 65 is also finished smooth in the region near the central opening 64 and this surface engages the upper surface 67 of the gear at its outer rim 60a. It is also provided with an outer web 60c. Thus the gear is effectively held in its proper location and is journalled so that it can be easily rotated about the pipe by turning the pinion shaft 55.

The gear 60 on its upper surface carries a series of cutter carriers 68 each consisting of a large trapezoidal boss having a channel 69 through it, whose side walls 70 are parallel to a radius of the gear circle drawn through the center of the channel. In the embodiment shown, there are four of these carriers but it is conceived that there might be two or six so long as an even number of carriers is provided for reasons hereafter related. The trapezoidal shape is used to reduce the weight and amount of material used in the gear and still provide sufficient strength to drive the cutters properly. In addition, such shape allows more clearance around the leading edge of the cutter for metal chips to curl into. A web 70 around the circumference of the upper portion of the gear is provided to stiffen the cutter carriers additionally and to provide a shield for the bearing surfaces at 64 to prevent metal chips from coming between the bearing surfaces and jamming the device. At a point on this web preferably midway between any two of the cutter carriers, a boss 71 is formed. This boss is threaded to receive a screw 72 which passes through a knob 73. The knob is rotatably journalled thereon and thus provides a hand hold with which it is possible to rotate the gear freely in order to adjust the position of the cutting surfaces as hereafter described.

Figure 7:
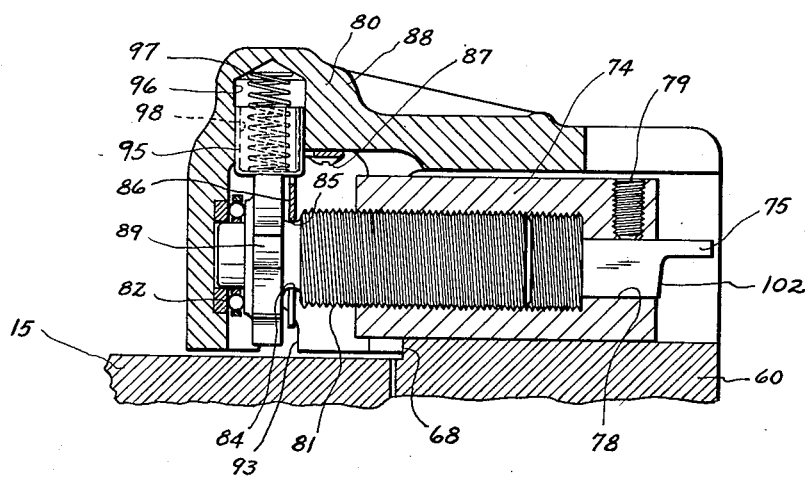
Fig. 7 is an enlarged view along line 7—7 of Fig. 6.

A cutting bit holder 74 (Fig. 7) is slidably journalled in the channel 69 of each of the cutter carriers 68. A tool bit 75 is firmly held in a substantially square opening 78 in one end of the bit holder 74 and is clamped therein by a hollow head set screw 79 which is threaded into the bit holder and bears on the upper surface of the bit.

A cover 80 is provided for each cutter carrier which serves to hold the bit holder 74 in the channel and additionally houses the drive mechanism therefore. The drive mechanism for the bit holder comprises a feed screw 81 and means to turn the screw upon rotation of the cutters and means to prevent the screw from turning when such turning is not desired. The feed screw 81 is rotatably journalled in the cover in a thrust bearing 82. At its other end the feed screw is threadably engaged with the bit holder 74. Thus, upon turning of the screw the bit will be moved slidably into or out of its carrier 68 dependent upon the direction of rotation of the screw.

A necked down section 84 is provided next to the threads into which the U-shaped opening 85 of a keeper 86 is fitted. This keeper is held in place in the cover 80 by two machine screws 87 which are screwed into a boss 88 on the top of the cover. This keeper provides a means to prevent the screw from being drawn into the cutter carrier 68 when the direction of rotation of the screw is such as to withdraw the bit holders 74.

Figure 8:
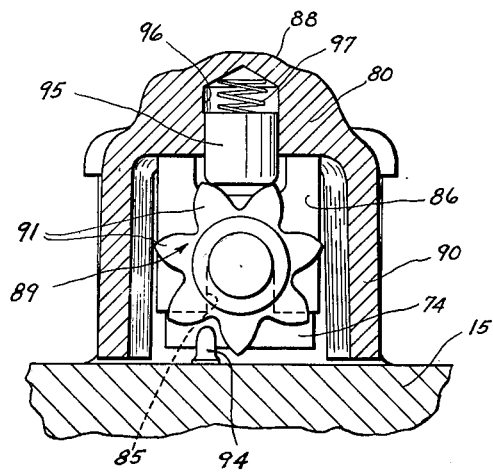
Fig. 8 is a view of one end of the cutter carrier with the cover broken away to show the operating mechanism.

A star wheel 89 which may be integral with the feed screw 81 and having an odd number of teeth 91 is provided between the necked down portion 84 and the bearing engaging surfaces at 82. This star wheel provides the means whereby the feed screw is turned. At the bottom on both sides of the skirt portion 90 of the cover we have provided small U-shaped openings 93, directly in line with the teeth 91 of the star wheel. At the same radius from the center of the central opening of the housing, we provide trip dogs 94 (Fig. 8) which may be in the form of screws threaded in the gear case cover 15 from the under side and projecting above the surface. There is one of these dogs for each pair of cutter carriers 68 since the tool bits are used in pairs as hereafter described. Upon turning the gear in the housing it can be seen that each time the cutter carrier 68 passes the trip dog 94 the dog will engage one of the teeth 91 of the star wheel 89 and move it, thereby turning the screw and either feeding the bit holder towards or away from the central opening 9 depending on the direction of rotation.

A spring detent mechanism engaging the star wheel is provided to determine the amount of rotation of the feed screw for each passage of the dog 94 and to prevent any rotation not induced by the dogs. This mechanism comprises a spring loaded plunger 95 slidably disposed in a hole 96 in the boss 88 of the cover 80. A spring 97 whose one end engages the bottom of the hole 96 and whose other end presses against the bottom of a depression 98 in the plunger serves to load the plunger and urge it downwardly against the teeth 91 of the star wheel. Since the star wheel has an odd number of teeth, the plunger, which spans the gap between two of the teeth, holds the wheel in position to be engaged by the dog, and insures that the wheel will be moved one space for each passage of the dog.

Figure 10:
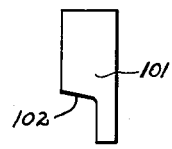
Figs. 10 and 11 are views of the cutter bits showing the two different tips used.
Figure 11:
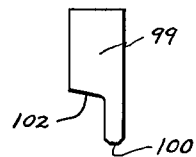
Figure 9:
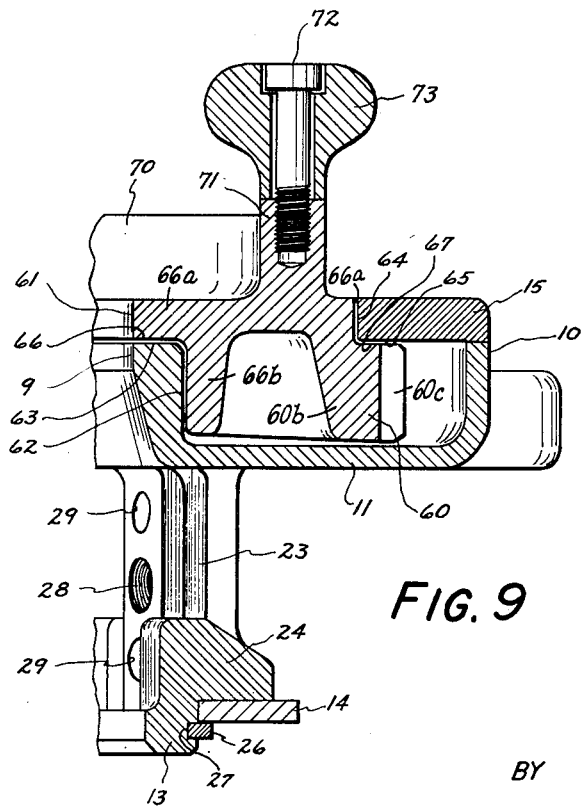
Fig. 9 is a sectional view along line 9—9 of Fig. 6.

The tool bits 75 which are held in the bit holder 74 are preferably used in pairs, each pair consisting of one leading bit 99 with a primary cutting edge 100 of chamfered form (Fig. 11) and a following bit 101 with a square primary cutting edge (Fig. 10). Use of such a pair of bits makes possible the cutting of a clean square bottomed kerf in the pipe with the expenditure of less force on each bit than would be required with the use of the square ended bit only. The cut will also be cleaner since the clips from the square ended cutter will curl into the space left by the chamfered cutter instead of being forced out radially. In addition, we provide a secondary cutting or deburring edge 102 on each of the cutters. This edge will come in contact with the pipe after it is cut and will serve to remove any burr remaining on the pipe, in effect chamfering the end making the starting of a threading tool thereon much easier. Each pair of bits is set to the same depth in our device and, therefore, it is necessary to provide only one dog for each pair. Thus, the leading bit is fed inward and cuts out the center portion of the kerf and as the carrier carrying the following bit passes the dog, it is also fed in the same amount and the square ended bit cleans out the corners of the kerf to form a straight edged, square bottomed cut.

In operation, our device is placed over the end of the pipe to be cut, which is preferably held in a vise, and is placed so that the cutters will engage the pipe at the desired length. The two clamping screws 30 which have knurled knobs may now be indexed to the proper step 53 on the gage ring 14. This may also be done before the tool is placed on the pipe. The third clamping screw is then tightened with a wrench thus clamping the tool to the pipe in proper centered location. The cutting bits are then run down into contact with the pipe by rotating the gear 60 in the proper direction using the knob 73. After the cutters are in contact with the surface of the pipe, the power unit or the handle is engaged with the square end 59 on the pinion shaft 55 and power supplied thereto to turn the gear. The cutters acting in the manner of a cut-off tool in a lathe cut a narrow kerf around the pipe and are fed in as described above until the pipe is cut through. The power operation may then be continued until the deburring edge has removed all burrs from the edge of the cut. The power unit or handle may then be disengaged and the cutters backed off by turning the gear in the opposite direction with the knob 73 and the tool removed from the pipe by releasing the clamping screws.

It is thus apparent that we have provided a portable tool for cutting off pipe capable of being either power or hand driven which is easy to use and which will provide quick economical and clean cutting of moderately large sizes of pipe.

Having thus described the invention, in an embodiment thereof, we are aware that numerous and extensive departures may be made therefrom without departing from the spirit or scope of our invention.

We claim:

1. A pipe cutting tool including a housing, said housing comprising a gear case and a cover therefor, a central work receiving opening through said gear case and said cover, clamping means on the under side of said gear case to clamp said housing firmly on a pipe extending through said opening, web means on said gear case surrounding said opening having a smoothly finished outer circumference and upper surface, gear means disposed in said housing comprising a disk, a central opening through said disk corresponding to the central opening in said gear case and said cover, inner web means on the under side of said disk surrounding said web means on said gear case and journalled thereon, a bearing surface on said disk surrounding said opening and in thrust bearing contact with the upper surface of said web on said gear case, an outer web on the under side of said disk extending beyond the outer rim of said disk, gear teeth on the periphery of said outer web, said outer rim of said disk being journalled in said central opening in said cover and the upper surface of the extended part of said outer web in thrust bearing engagement with the under side of said cover surrounding said central opening therein, cutter carriers mounted on said gear means adapted to be carried about said pipe thereby, cutters slidably disposed in said carriers, screw means in threadable engagement with each of said cutters to move them toward or away from said pipe, a star wheel carried by said screw means extending beyond said outer rim of said disk, dog means on said cover adapted to engage said star wheel to turn it upon rotation of said gear in said housing, pinion means enclosed in said housing in driving engagement with said gear means, a shaft for said pinion means journalled in said gear case and said cover, said shaft having coupling surfaces outside of said cover adapted to receive torque from some external source.

2. A pipe cutting tool comprising a housing including an annular main gear case section open at one side thereof, a driven annular gear member rotatably journaled in said main gear case section and having a face portion extending through said opening in said gear case section, a cover plate surrounding said face portion of said gear and removably secured to the housing in overlapping relation with said face portion of said gear member to hold the same in position within the housing, a plurality of elongated cutter supporting housings carried by said gear member and extending lengthwise radially from the outer face portion of the gear member and overhanging the outer face of said cover plate in closely spaced relation thereto, each of said cutter supporting housings having a radially disposed cutter reciprocally journaled therein and radially disposed screw means journaled in each of the cutter supporting housings connected to the cutter for advancing the same upon rotation of said screw means, said screw means each having a star wheel provided with teeth and disposed thereon inside the cutter supporting housing and movable with said gear around the outer face of the cover plate in closely spaced relation thereto, each of said cutter supporting housings having in opposite side walls thereof at the bottom part of the same openings directly in line with the teeth of the star wheel within the cutter supporting housing, and pins disposed on the outer side face of the cover plate on opposite peripheral portions thereof projecting outwardly therefrom at the same radius from the central opening of said main gear case section as said star wheels in the path of travel of the star wheels for simultaneous engagement with the star wheels at opposite peripheral portions of said main gear case section when said gear is rotated, said pins being of a size to pass through said openings in the side walls of the cutter supporting housings.

References Cited in the file of this patent
UNITED STATES PATENTS

| Number | Name | Date |
| --- | --- | --- |
| 587,093 | French | July 27, 1897 |
| 760,128 | Jacobson | May 17, 1904 |
| 905,876 | Hess | Dec. 8, 1908 |
| 1,074,334 | Vosper | Sept. 30, 1913 |
| 1,097,152 | Wagner | May 19, 1914 |
| 1,115,277 | Bodkin | Oct. 27, 1914 |
| 1,749,861 | Vosper | Mar. 11, 1930 |
| 1,897,374 | Goebel | Feb. 14, 1933 |
| 2,097,358 | Whittaker | Oct. 26, 1937 |
| 2,399,906 | Bentley | May 7, 1946 |
| 2,455,183 | Lobdell | Nov. 30, 1948 |
| 2,459,564 | Latta | Jan. 18, 1949 |